Nov. 7, 1939.  H. M. JANOWSKI  2,178,665
APPARATUS FOR MAKING INCISIONS
Filed Dec. 8, 1936  2 Sheets-Sheet 1

INVENTOR.
Henry M. Janowski
F. Bascom Smith
BY  ATTORNEY.

Nov. 7, 1939.  H. M. JANOWSKI  2,178,665
APPARATUS FOR MAKING INCISIONS
Filed Dec. 8, 1936  2 Sheets-Sheet 2

INVENTOR.
Henry M. Janowski
BY
F. Bascom Smith
ATTORNEY.

Patented Nov. 7, 1939

2,178,665

UNITED STATES PATENT OFFICE 2,178,665

APPARATUS FOR MAKING INCISIONS

Henry M. Janowski, South Bend, Ind., assignor to Peco Manufacturing Corporation, Philadelphia, Pa., a corporation of Pennsylvania Application December 8, 1936, Serial No. 114,762

4 Claims. (Cl. 90—15.1)

This invention relates to cutting apparatus and more particularly to devices for making incisions in the surfaces of rubber or similar yieldable materials, such for example, as in automobile tires.

It has been heretofore proposed to groove and slit resilient materials, such as tires, for the purpose, among others, of increasing the gripping action thereof on road surfaces, but the cutting devices heretofore used for this purpose have not been entirely satisfactory for the reason that the rubber is so deformed by pressures exerted thereon during the cutting operation that the resultant incisions, when the material springs back into normal position, are not of uniform depth and breadth.

It is accordingly an object of the present invention to provide novel cutting apparatus whereby grooves of uniform width may be cut in resilient or yieldable material irrespective of the irregularity of the surface of said material.

Another object of the invention is to provide novel means in combination with apparatus of the above character for gauging the depth of the incisions to be cut and for insuring that the latter will be of substantially uniform depth.

Still another object is to provide cutting apparatus of the above type wherein novel means are employed for driving or moving the cutting blade during the cutting operation.

A still further object is to provide a novel method for making incisions in rubber or similar resilient and yieldable materials, such as in automobile tires, for example.

The above and further objects and novel features of the invention will more fully appear from the following detailed description when the same is read in connection with the accompanying drawings. It is to be expressly understood, however, that the drawings are for the purpose of illustration only and are not intended to define the limits of the invention, reference being primarily had for this latter purpose to the appended claims.

In the drawings, wherein like reference characters refer to like parts throughout the several views, Fig. 1 is an isometric view showing a tire grooving apparatus embodying one form of the present invention;

Figure 1:
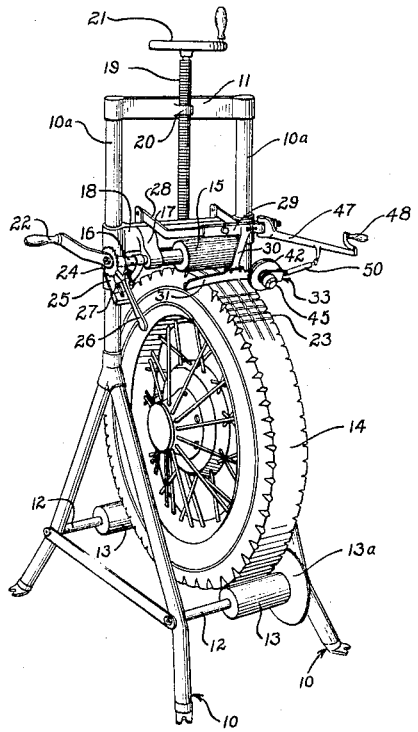
Figure 2:
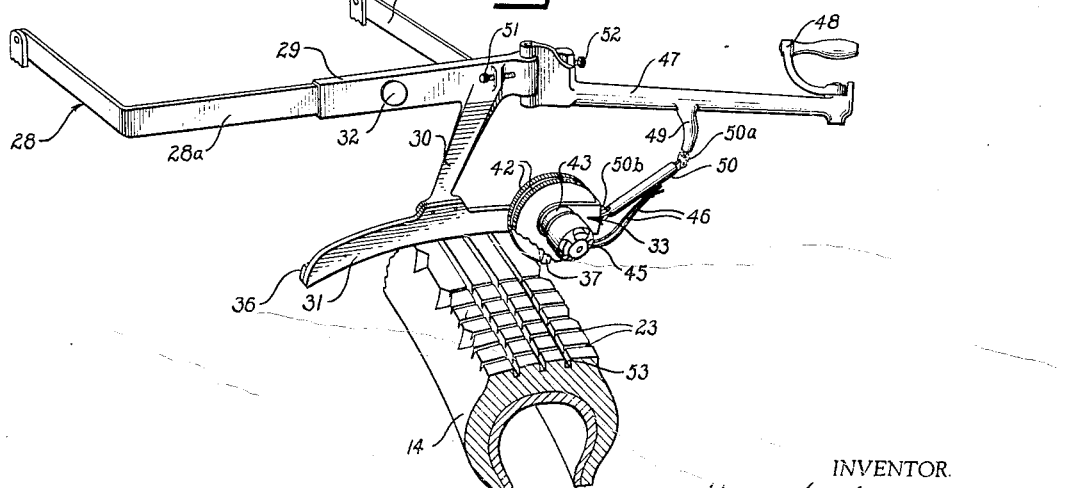
Fig. 2 is a detail isometric view, partly in section and with parts broken away, showing a portion of the embodiment of Fig. 1 on an enlarged scale.
Figure 3:
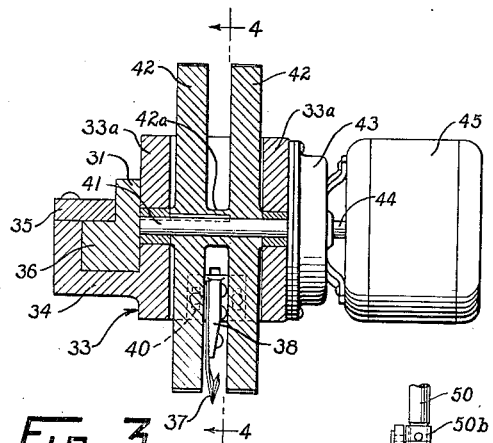
Fig. 3 is a side elevation, partly in section and on an enlarged scale, of the cutter assembly of the device of Fig. 1, the section being taken on line 3—3 of Fig. 5.
Figure 4:
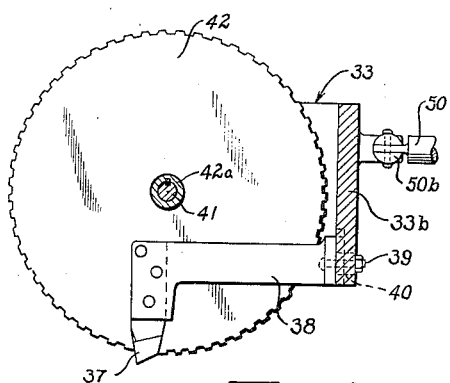
Fig. 4 is a front elevation, partly in section, of said assembly taken on line 4—4 of Fig. 3.
Figure 5:
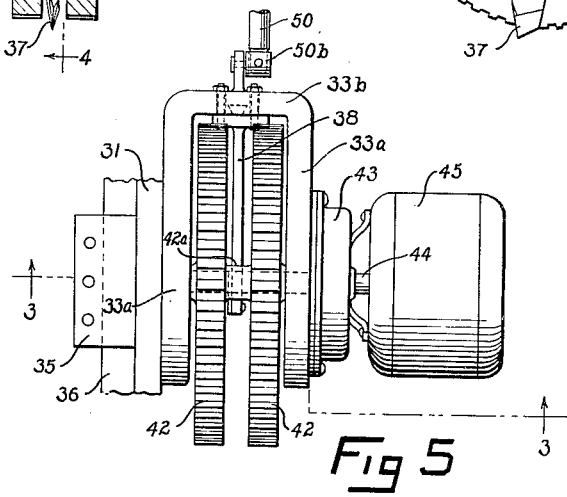
Fig. 5 is a top plan view of the mechanism shown in Figs. 3 and 4.

Referring more particularly to Figs. 1 to 5, inclusive, of the drawings, the invention is illustrated, by way of example, in a form adapted for cutting cross or transverse grooves in the peripheral surfaces of automobile tires to thereby provide suitable and highly effective tread either on new or used tires. As shown, the apparatus comprises rigid supporting means constituted by a pair of inverted Y-shaped standards 10 held in spaced relation with respect to each other by a cross-piece 11, which joins the upwardly extending portions 10a of said standards, and a pair of shafts 12 on each of which a flanged roller 13 is rotatably mounted, said rollers being adapted to support tire 14 for rotation in a vertical plane.

For the purposes of imparting rotary motion to tire 14 and to permit the insertion of tires of a wide range of sizes, a roughened driving roller 15 rigidly secured to a shaft 16 is rotatably supported by suitable brackets 17 which are formed integrally with and project forwardly and downwardly from a vertically adjustable cross-bar or support 18, the ends of which slidably engage posts 10a. The vertical position of bar 17 and, hence, of roller 15 is rendered adjustable by a screw 19 which threadedly engages a lug 20 on cross-piece 11 and is connected at its lower end to said bar for rotary movement relative thereto. A hand wheel 21 is provided on the upper end of screw 19 to facilitate the turning thereof. Roller 15 may thus be readily lowered and raised into and out of firm, frictional engagement with the surface of tire 14.

Said tire, being thus supported on rollers 13, 13 and contacted by drive roller 15, may be rotated about a fixed axis by actuating said drive roller and for this purpose a crank 22 is provided on the outer projecting end of shaft 16. The axes of rollers 13 and 15 are preferably so disposed with respect to each other and with respect to the plane of rotation of tire 14 that the latter is automatically held thereby against discs or flanges 13a on rollers 13 when said tire is rotated by roller 15 in a counterclockwise direction, as viewed in Fig. 1.

In order to insure proper and uniform peripheral spacing of cross-grooves 23 that are to be cut in the periphery of tire 14 by means and in a manner to fully appear hereafter, means are provided for intermittently moving said tire through predetermined angular distances. Said means, in the form shown in Fig. 1, comprises a ratchet wheel 24 mounted on shaft 16 for rotation therewith and a coacting resilient pawl 25 which constantly engages said ratchet and is carried by a lever 26, the latter being loosely mounted on shaft 16 for angular movement relative thereto. Thus, when lever 26 is raised and then moved to its lowered position, roller 15 will be actuated through the coaction of pawl 25 and ratchet 24, and tire 14 will be rotated in a counter-clockwise direction through a predetermined angular distance determined by the downward movement of said lever. A set screw 27 is provided in an upwardly extending lug on lever 26 for limiting the angular movement of the latter, thereby constituting means for adjusting the angular movement of tire 14 for each actuation of said lever and, hence, the distance between cross-grooves 23.

Any suitable means may be provided for mounting the cutter assembly to be hereinafter described on the above apparatus and such means, in the form shown, are constituted by a support or carrier comprising a bracket 28 pivotally secured to bar 18 and a channel-like member 29 having sliding telescopic engagement with the laterally extending portion 28a of said bracket. Extending downwardly and forwardly from member 29 and formed integrally therewith is an arm 30 that carries a track 31 which is preferably curved downwardly from a central point toward each end. By sliding member 29 relative to bracket portion 28a, the center or highest point of track 31 may be adjusted to a position vertically above the center of tire 14 and may be secured in that position by any suitable means such as a set screw 32.

The cutter assembly comprehended by the present invention, whereby transverse grooves or incisions of uniform depth and width may be cut in the surface of tire 14 or in other surfaces with utmost ease and without the exercise of particular skill, is illustrated in Figs. 1 to 5, inclusive, as comprising a U-shaped carriage 33 slidably mounted on track 31, said carriage comprising a pair of arms 33a, 33a connected to each other at one end by a cross-piece 33b and having an angular bracket portion 34 on one of said arms which extends around the lower edge of said track. A plate 35, secured to or formed integrally with portion 34 and engaging the upper surface of a flange 36 on track 31, is provided for slidably supporting carriage 33 on said track. A cutting blade 37 of any suitable shape, depending on the size and shape of the desired groove, is secured by any suitable means such as rivets to an arm 38 which is, in turn, adjustably mounted on portion 33b of carriage 33 by bolts 39 that project through elongated slots 40 (Fig. 3) in said connecting portion. If it is desired to slit the surface of tire 14, as distinguished from grooving the same, a straight cutting blade may be employed in lieu of the U-shaped blade 37.

For a purpose to more fully appear from the following detailed description of the operation of the invention, a shaft 41 is rotatably journalled in carrier arms 33a and has a pair of axially spaced discs 42 mounted thereon for rotation therewith, said discs, in the form shown, being formed integrally with a hub 42a and having the peripheries thereof roughened in any suitable manner so that the same will frictionally engage the surface of tire 14. The outer end of shaft 41 is drivably connected, through suitable reduction gearing in a housing 43, to armature shaft 44 of a small electric motor 45, the latter, in turn, being supported by said housing and electrically connected to a suitable source of electric energy (not shown) by leads 46. It will be seen that blade or cutter 37 may be adjusted to cause any desired portion thereof to project beyond the peripheries of discs 42, 42 and that the depth of incisions 23 may thus be regulated.

The above described cutter assembly is adapted to be manually reciprocated on track 31, 36 through the medium of a lever mechanism comprising a lever 47, one end of which is bifurcated and pivotally connected to member 29. Said lever is provided with a pivoted handle 48 at the outer end thereof and a downwardly projecting arm 49 intermediate its ends, said arm being connected to carriage 33 by means of a rod 50 which is secured by universal pivotal connections 50a and 50b to said arm and carriage, respectively. The reciprocation of said carriage by the above-described lever mechanism may be adjustably limited, if desired, by means of a pair of oppositely disposed set screws 51 and 52 provided on a suitable lug and extension, respectively, of member 29, said screws being effective to limit the angular movement of lever 47 and, hence, the reciprocatory movement of carriage 33.

In the operation of the above-described embodiment of the invention, tire 14 is first placed on rollers 13 and supporting bar 18 is lowered to cause roller 15 to firmly engage the tire. Carriage 33 and the parts carried thereby are then manipulated by grasping handle 48 and moving lever 47 through a horizontal arc determined by set screws 51 and 52. While thus moving the cutting assembly from right to left, as viewed in Fig. 2, discs 42, 42, which are being driven by motor 45 in a counter-clockwise direction, are held in engagement with the surface of tire 14, thus permitting blade 37 to make an incision 23, the width of which is determined by the design of the blade and the depth of which is determined by the vertical adjustment of said blade, i. e., its position with relation to the peripheries of discs 42, 42. If the effect of the rotation of said discs by motor 45 be disregarded, it will be seen that the pressure exerted by the blade or cutter would cause the material being grooved or slitted to yield and stretch in the direction of movement of said cutter. This yielding or stretching becomes greatest near the end of a groove which is being cut, such as when the blade approaches a depression or circumferential groove 53 or the left-hand edge of the tire. It will also be apparent that, as a blade of the character of cutter 37 passes through a resilient material, the amount of material actually removed by said cutter will vary with the extent to which said material is stretched during the cutting operation. Accordingly, when the material returns to normal position after the tension is released, the width of the actual groove will be less than the distance between the sides of the cutting blade. Since, as pointed out above, the extent of the stretching caused by the pressure of cutter 37 varies at different points along the length of the groove, the stretch being a maximum near the end from which the cutter emerges, it will be seen that, when the effects of discs 42, 42, are disregarded, a groove of unequal width will result. In addition to the above, the stretching or yielding of the material being cut causes the material in advance of the cutter and particularly the material adjacent the right-hand edges of grooves 53 or near the left-hand edge of the tire to lean in the direction of movement of the cutter, thereby causing a decrease in the depth of incisions 23 near the ends thereof from which the cutter emerges.

To overcome the above difficulties and thereby cut incisions 23 so that the same are of uniform width and depth throughout their lengths, discs 42, 42 are held downwardly in firm engagement with the surface of the tire and permitted to rotate in sliding frictional engagement therewith, the point of contact between said discs and the tire surface being adjacent or preferably slightly in advance of the cutting edge of blade 37. Discs 42, 42 thus tend to move the material at the surface of the tire toward blade 37 and, accordingly, prevent any deformation or stretching of said material toward the left, i. e., in the direction of movement of blade 37. The resilient material of the tire adjacent blade 37 is thus maintained in a normal and upright condition throughout the cutting operation and a groove having uniform width and depth throughout its length results. In addition to the above effects of discs 42, 42, it will also be seen that the rotation thereof when in contact with tire 14 tends to move blade 37 from right to left across the tire, i. e., in groove cutting direction and, accordingly, greatly reduces the effort required to manipulate lever 37.

After a groove 23 has thus been cut, the cutting assembly is lifted out of engagement with tire 14 and returned to the right, or illustrated position. The lifting of said assembly is effected by exerting an upward pressure at handle 48 to thereby pivot carrier 28, 29 about the pivots provided therefor on support bar 18. Tire 14 is then advanced by actuating lever 26 and the above operation is repeated. It will, of course, be understood that, by reversing blade 37 and the direction of rotation of discs 42, 42, incisions may be made during movement of the cutting assembly from left to right.

Figure 6:
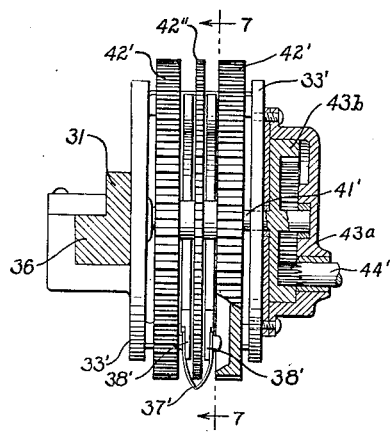
Fig. 6 is a side elevation, partly in section and with parts broken away, of a modification of the cutter assembly comprehended by the present invention; and, Fig. 7 is a front elevation, partly in section, of said modification, the section being taken on line 7—7 of Fig. 6.
Figure 7:
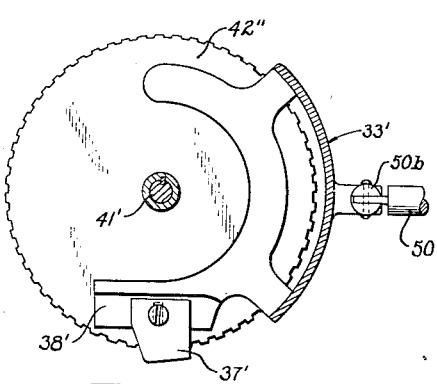

In a second embodiment of the invention illustrated in Figs. 6 and 7, a U-shaped cutter 37' is secured to a pair of laterally spaced arms 38' formed integrally with a carriage 33', the latter being slidably mounted on track 31, 36 in the same manner as carriage 33 above described. Cutter 37' is secured to arms 38' by set screws or other suitable means and is preferably slotted to permit vertical adjustment thereof. A shaft 41' is rotatably journalled in carriage 33' and has a plurality of discs 42' and 42'' keyed or otherwise suitably secured thereto for rotation therewith, said discs having the peripheries thereof slotted and being adapted to serve the same purpose as discs 42 of the first embodiment. Intermediate disc 42'' is comparatively narrow and extends between arms 28' and the sides of blade 37', whereas discs 42', 42' are disposed on opposite sides of and adjacent said blade. All of said discs are adapted to be rotated as a unit by any suitable power means (not shown) acting through shaft 44', reduction gears 43a, 43b, and shaft 41' which is drivably connected or formed integrally with gear 43b. The operation of the embodiment of Fig. 6 is the same as that described in connection with the embodiment of Fig. 3.

There is thus provided novel means which are simple both in construction and operation whereby incisions of uniform dimensions may be cut with ease and rapidity in the surfaces of yieldable or resilient materials. Although only two embodiments of the invention have been illustrated and described in detail, it is to be expressly understood that the same is not limited thereto. For example, it will now be apparent to those skilled in the art that the cutting assembly above described may be reciprocated by power means instead of by hand or that said assembly may be stationarily mounted and the material to be grooved or slitted moved relative thereto. Various other changes may also be made in the design and arrangement of parts illustrated without departing from the spirit and scope of the invention. For a definition of the limits of the invention, reference will be had primarily to the appended claims.

What is claimed is:

1. In apparatus of the class described, means for rotatably supporting a tire, means including ratchet mechanism for rotating said tire through predetermined angular distances, a support pivotally mounted adjacent said tire, a cutter assembly slidably mounted on said support, and means for imparting reciprocatory movement to said assembly, the latter comprising a U-shaped cutting blade, a rotatable disc on each side of said blade adapted to frictionally engage the surface of said tire, an electric motor for rotatably driving said discs and reduction gearing interposed between said motor and said discs.

2. In apparatus of the character described, the combination of a carriage mounted for movement transversely of a rotatable article, a track for said carriage, a cutter on said carriage adapted to engage said article for cutting the latter, rotatable means on said carriage adjacent said cutter and adapted to frictionally engage said article, means for rotatably driving said last-named means, and means for reciprocating said carriage on said track.

3. In apparatus of the class described, a U-shaped cutter adapted for cutting grooves in a material, a plurality of rotatable elements adjacent said cutter for frictionally engaging said material during the groove cutting operation, one of said elements extending between the sides of said cutter, and means for rotatably driving said elements.

4. In apparatus of the class described, a U-shaped cutter adapted for cutting grooves in a material, a rotatable disc extending between the sides of said cutter, a rotatable disc adjacent each side of said cutter, all of said discs being adapted to frictionally engage said material during the groove cutting operation, and means for rotatably driving said discs.

HENRY M. JANOWSKI.